Aug. 11, 1959   M. H. SIDEBOTHAM, SR., ET AL   2,898,824
METHOD OF AND APPARATUS FOR WINDING A SHEATH AROUND A CORE
Filed Jan. 20, 1955   13 Sheets-Sheet 9

Fig. 16.

INVENTORS
MELVIN H. SIDEBOTHAM, SR.
GORDON L. SIDEBOTHAM,
MELVIN H. SIDEBOTHAM, JR.
BY
ATTORNEY

Aug. 11, 1959  M. H. SIDEBOTHAM, SR., ET AL  2,898,824
METHOD OF AND APPARATUS FOR WINDING A SHEATH AROUND A CORE
Filed Jan. 20, 1955  13 Sheets-Sheet 10

INVENTORS
MELVIN H. SIDEBOTHAM, SR.
GORDON L. SIDEBOTHAM, JR.
MELVIN H. SIDEBOTHAM, JR.
BY
ATTORNEY

Aug. 11, 1959   M. H. SIDEBOTHAM, SR., ET AL   2,898,824
METHOD OF AND APPARATUS FOR WINDING A SHEATH AROUND A CORE
Filed Jan. 20, 1955   13 Sheets-Sheet 12

INVENTORS
MELVIN H. SIDEBOTHAM, SR.
GORDON L. SIDEBOTHAM,
MELVIN H. SIDEBOTHAM, JR.
BY Luther W Hawley
ATTORNEY

United States Patent Office 2,898,824
Patented Aug. 11, 1959

2,898,824

METHOD OF AND APPARATUS FOR WINDING A SHEATH AROUND A CORE

Melvin H. Sidebotham, Sr., Gordon L. Sidebotham, and Melvin H. Sidebotham, Jr., Winchester, Mass., assignors, by mesne assignments, to Joseph Dixon Crucible Company, Jersey City, N.J., a corporation of New Jersey Application January 20, 1955, Serial No. 482,931

9 Claims. (Cl. 93—81)

This invention relates to a method of and a machine for winding a sheath around a core and, more particularly, to the manufacture of pencils having a sheath of sheet material, such as paper, wound around a core of marking material, such as graphite, commonly termed marlead, or around a core of rubber or other desired material.

One of the objects of the invention is to provide a simple and practical machine so constructed that the mechanism will continue in operation and feed a web of paper, enclose the cores of lead in one edge, cut the web into sheets, wind the sheets around the lead, and eject the pencils without necessitating any reversal of the operating parts.

Another object of the invention is to provide a method and machine of the character described that are simple and practical and are capable of high speed operation.

Further objects of the invention will appear from the following specification taken in connection with the drawings which form a part of this application, and in which

Fig. 12 is a sectional elevation taken on a horizontal plane through the left hand end of the machine, illustrating driving connections and mechanisms for the various parts;

The invention briefly described comprises a plurality of mechanisms for feeding a strip of paper, applying glue at one longitudinal edge of the strip, folding the glued edge, depositing a lead or other desired core under the folded edge, sealing the lead in the edge of the strip, cutting the strip into sheets, centering the sheets on the delivery table, feeding the sheets at right angles to the direction of feed of the web to winding rolls, winding the sheet into a strip around the core, sealing successive convolutions of the sheath, and discharging the pencil from the machine.

Further details of the invention will appear from the following description.

As above explained, the machine embodying the invention comprises a plurality of operating mechanisms which may, for convenience in describing the invention, be divided or classified under the following headings: Glue mechanism for applying the glue to the edge of the strip; folding the edge and inserting a pencil lead therein; cutting the strip between successive leads into a sheet; mechanism for feeding the strip to and through the cutter; mechanism for feeding the sheet to center the sheet on the delivery table; mechanism for feeding the sheet at right angles to the direction of feed of the strip to the winding rolls; mechanism for operating the winding rolls to wind the sheet around the core into a sheath; and mechanism for discharging the pencil from the machine.

Mechanism for applying glue to the edge of the strip

This mechanism is illustrated particularly in Figs. 1, 4, 5, 6 and 7. The main frame of the machine consists of a plate or table 30 and frame members 31 and 32 for supporting the table 30. A strip 33 is led from a suitable supply roll around rollers 34 and 35 and downwardly beneath a roller 36 to the top of the table 30.

Figure 4:
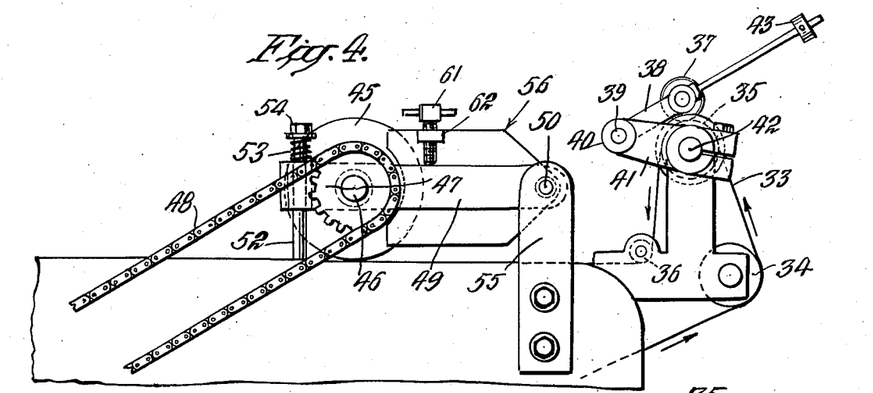
Fig. 4 is an elevational view showing the right hand end of the machine in which the web is fed beneath glue applying mechanism.
Figures 5, 6, 7:
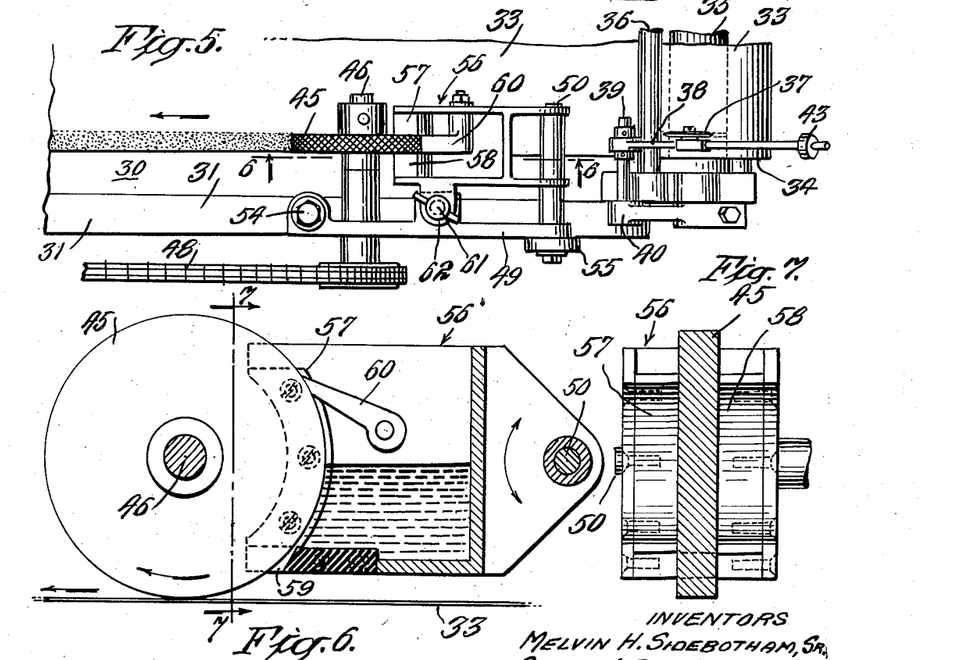
Fig. 5 is a top plan view of the structure shown in Fig. 4.
Fig. 6 is an enlarged sectional elevation through the glue pot and glue applying wheel or roller taken substantially on line 6—6 of Fig. 5, looking in the direction of the arrows.
Fig. 7 is a sectional elevation taken substantially on line 7—7 of Fig. 6, looking in the direction of the arrows.

A tapered scoring roller 37 is mounted on an arm 38 pivoted at 39 to a spindle 40 carried by an arm or bracket 41 mounted on the outer end of the shaft 42 which supports the roller 35. An adjustable weight 43 is mounted on the outer end of the arm 38. The purpose of the scoring roller 37 is to score one edge portion of the strip 33 to facilitate the folding of this edge in a manner hereinafter described.

After the strip 33 leaves the guide roller 36, it is drawn beneath a glue roller or wheel 45 by suitable strip feeding mechanism hereinafter described. The wheel or roller 45 is mounted on a spindle 46 which has a sprocket wheel 47 secured thereto. The sprocket wheel 47 is driven by a chain 48 from a suitable source of power.

The spindle 46 is mounted on an arm 49 which is mounted on a fixed pivot 50 and has at its opposite end a vertical sleeve 51 which receives a threaded stud 52 which is secured to and extends upwardly from the side frame member 31. A spring 53 is mounted on the stud 52 and a nut 54 at the upper end of the stud exerts through the spring a resilient downward pressure on the arm 49 and on the shaft 46 and glue wheel 45 carried thereby.

The spindle 50 which is carried by a suitable bracket 55 has pivotally mounted thereon a glue pot 56. It will be noted that the glue wheel 45 rotates between a pair of blocks 57 and 58 which are formed of suitable plastic material, such as Bakelite, and it will also be noted that the lower end of the glue pot is cut away, as shown at 59, to receive the wheel 45. The blocks 57 and 58 act as wipers and because of the nature of the material of which they are made will not cause any wear on the glue wheel 45, which may be made of brass or other suitable material. Furthermore, there will not be a tendency for the wheel to stick between the blocks.

A pivoted wiper 60 rests against the rim of the wheel 45 and removes excess glue therefrom. It will be noted from the showing in Figs. 4 and 5 that a screw 61 is mounted in a lug 62 on the glue pot and bears against the upper edge of the arm 49. By turning this screw the glue pot can be tilted about the spindle 50, thus varying the amount of contact between the glue in the pot and the rim of the wheel. In this way the amount of glue carried by the wheel to the strip can be regulated.

Figure 1:
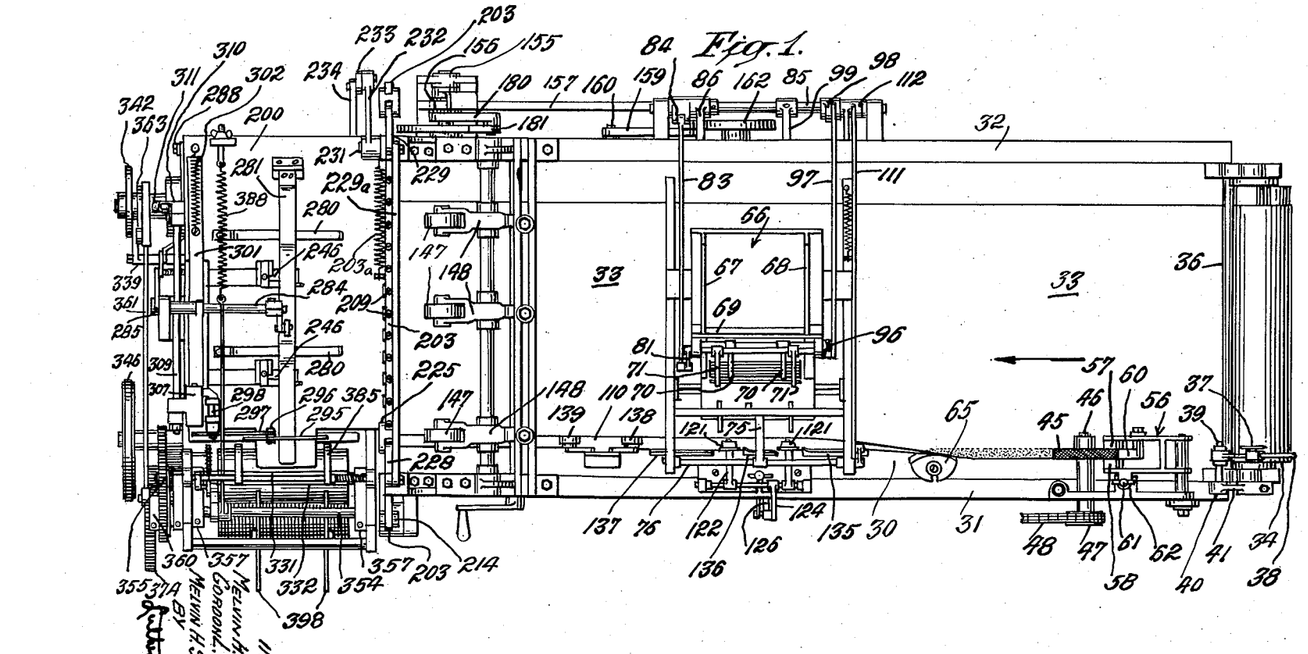
Fig. 1 is a top plan view of a machine constructed in accordance with the invention.

Mechanism for folding the strip edge, inserting leads therein, and sealing the edge around the leads This mechanism is illustrated particularly in Figs. 1, 3, 16 and 17. As shown in Fig. 1, after the strip 33 has received the glue on the edge thereof, the edge engages an edge folding member 65 of suitable construction by which the edge of the strip is folded in the manner illustrated in Figs. 1, 16 and 17. The folded edge then passes beneath lead feeding and inserting mechanism, by means of which the leads are fed one at a time beneath the folded edge of the strip and in spaced relation on the strip.

Figure 16:
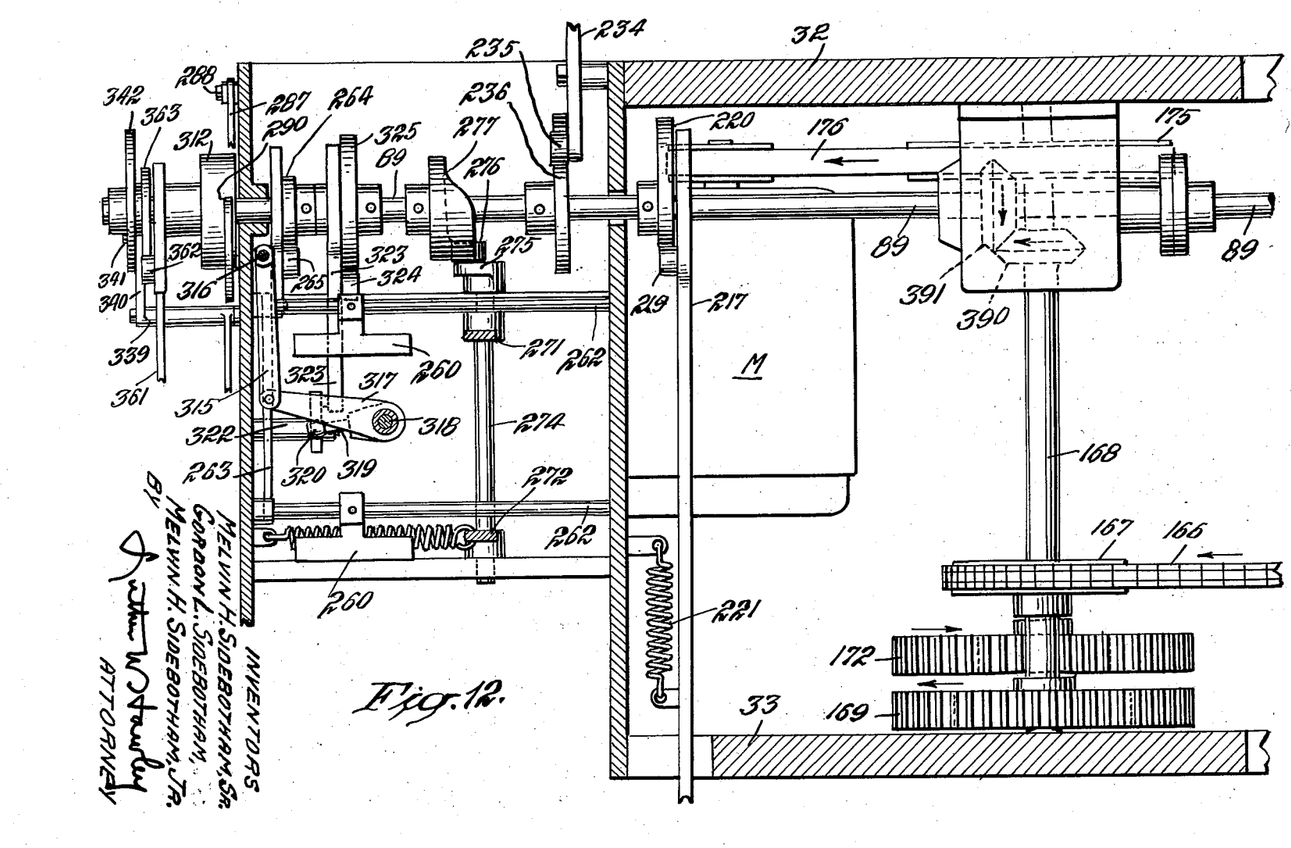
Fig. 16 is a sectional elevation taken substantially on line 16—16 of Fig. 3, looking in the direction of the arrows, and illustrating the lead control and feed mechanism.
Figure 17:
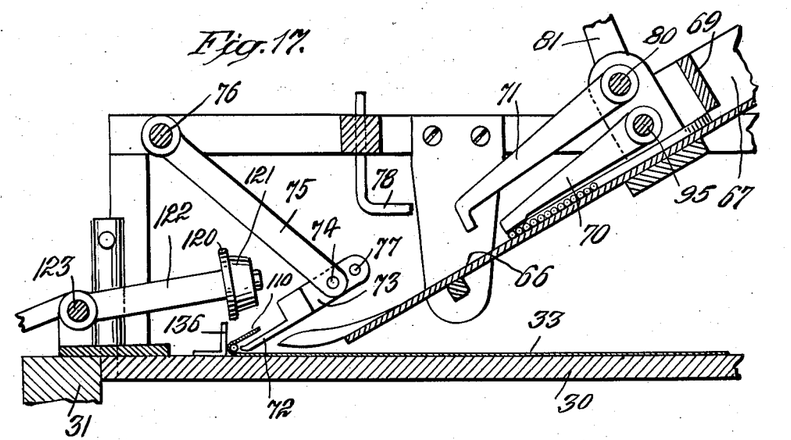
Fig. 17 is an enlarged sectional elevation showing the lead control and feed.

The leads are placed in a hopper or downwardly inclined chute having a bottom 66 and side walls 67 and 68. In their downward passage the leads pass beneath a bar 69. The passage of the leads downwardly to the delivery end of the chute is regulated by a pair of fingers 70 and 71. The fingers 70, as shown in Fig. 17, press against the leads disposed in the chute, and when the fingers 71 are disposed in their downward position, as shown in Fig. 16, the fingers 70 will raise to permit one lead to be positioned between the lower end of the fingers 70 and the fingers 71. Thereafter, the fingers 71 are raised, permitting this lead to roll down the chute into the folded edge of the sheet, as shown in Fig. 17. It will be understood that when the fingers 71 are raised to release this lead, the fingers 70 will be disposed in their lower position, thereby retaining the remaining leads in position on the chute. After the lead has rolled into the folded edge of the strip, it is pressed into the bend of this edge by means of a presser plate 72 carried by an arm 73 pivoted at 74 on an arm 75 mounted on a spindle 76. The presser plate 72 is shown in Fig. 17 in its lower position and after it has performed its function it is raised to the position shown in Fig. 16 where a pin 77 on the lower end of the arm 73 engages a stop 78, thereby tilting the arm to the position shown in Fig. 16.

The mechanism for operating the fingers 70 and 71 and the arms 75 and 76 will now be described. The fingers 71 are carried by a spindle 80 which has secured thereto an arm 81 pivoted at 82 to a link 83, the other end of the link being pivoted to the upper end of an arm 84 mounted on a spindle 85. The spindle 85 also has mounted thereon an arm 86 which has on its other end a roller 87 which engages a cam 88 mounted on a shaft 89, driven in a manner hereinafter described. The arms 84 and 86 have a common hub. As the shaft is rotated, the cam will, at the desired times in the sequence of operations, raise and lower the fingers 71 to release the leads, permitting them to roll downwardly into the folded edge of the strip.

The fingers 70 are carried by a spindle 95 which has thereon an arm 96 which is connected to a link 97 which is connected to an arm 98 on the shaft 85. Shaft 85 has secured thereto an arm 99 having a roller 100 engaging a cam 101 on the shaft 89.

After the lead has been released in the manner above described and rolls into the folded edge 110 of the strip 33, the presser plate 72 is moved beneath the folded edge 110 and pushes the lead into the bend of the fold. The spindle 76 has mounted on the end thereof, an arm 109 which is connected by a link 111 to an arm 112 mounted on the spindle 85. The arm 112 has a hub 113 which is fixed to a hub 114 of an arm 115 which has a roller 116 engaging a cam 117 on the shaft 89. The shaft and cams are shown particularly in Fig. 9.

After the lead has been thus pressed into the bend of the folded edge 110, the outer surface of the edge 110 is engaged by flanges 120 on rollers 121 mounted on arms 122 carried by a spindle 123. This spindle has also connected thereto an arm 124 which is pivoted at 125 to a pitman link 126. This link has a yoke 127 on the other end which straddles the shaft 89 and the yoke carries a roller 128 which engages a cam 129 on the shaft 89. A spring 130 holds the roller against the cam. As the cam is rotated, the pitman 126 will cause the arms 124 and 122, through the shaft 123, to raise and lower the wheels 121 and to cause the flange 120 to engage the fold 110 and press the outer edge of the fold downwardly on the lead L.

Figure 3:
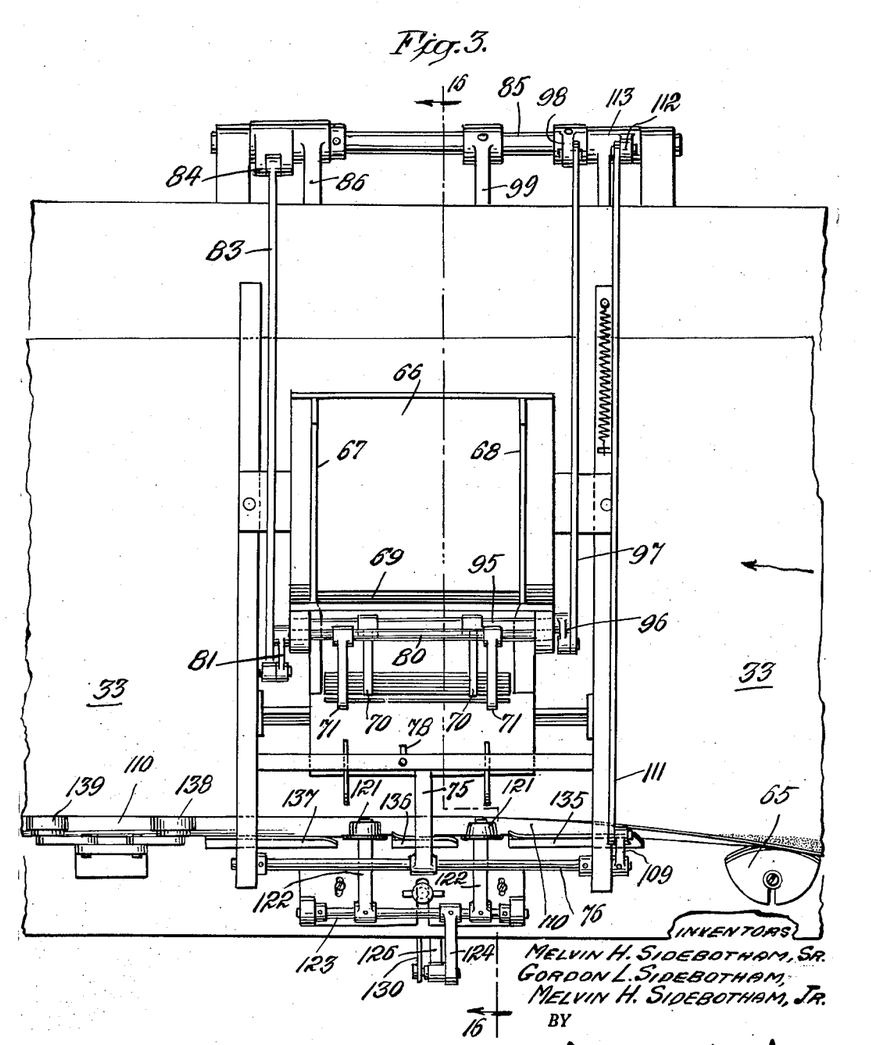
Fig. 3 is a top plan view of the lead or core feeding and applying mechanism.

It will be noted from Fig. 3 that the roller 121 at the right is tapered and the other roller 121 is cylindrical. These rollers are disposed between guides 135, 136 and 137 which engage the folded or rolled edge of the strip 33. The tapered portion of the right hand roller, viewing Fig. 3, will assist in folding the edge 110 of the strip 33 and the cylindrical roller 121 at the left in Fig. 3 will further fold the edge. From the lead depositing mechanism the folded strip passes beneath a pair of rollers 138 and 139 which engage the portion of the edge 110 inside of the lead and press this portion downwardly to seal the lead in the folded edge of the strip.

Strip feed mechanism

This mechanism is shown particularly in Figs. 1, 2, 9, 10 and 11. The strip, as it advances on the table beyond the sealing rollers 138 and 139 just described, passes over a feed roller 145 which is mounted beneath an opening 146 in the table and extends upwardly in the opening to contact a plurality of rollers 147 which are carried by arms 148 pivoted at 149 and have secured to their outer ends springs 150 which hold the rollers 147 downwardly to press the paper strip between the rollers 147 and the roller 145.

The delivery end of the table 30 has mounted in a recess in the upper surface, a plate 151 which guides the paper strip over the blade 201. The plate 151 has openings 152 to receive the rollers 145 and 147.

Figures 9, 10:
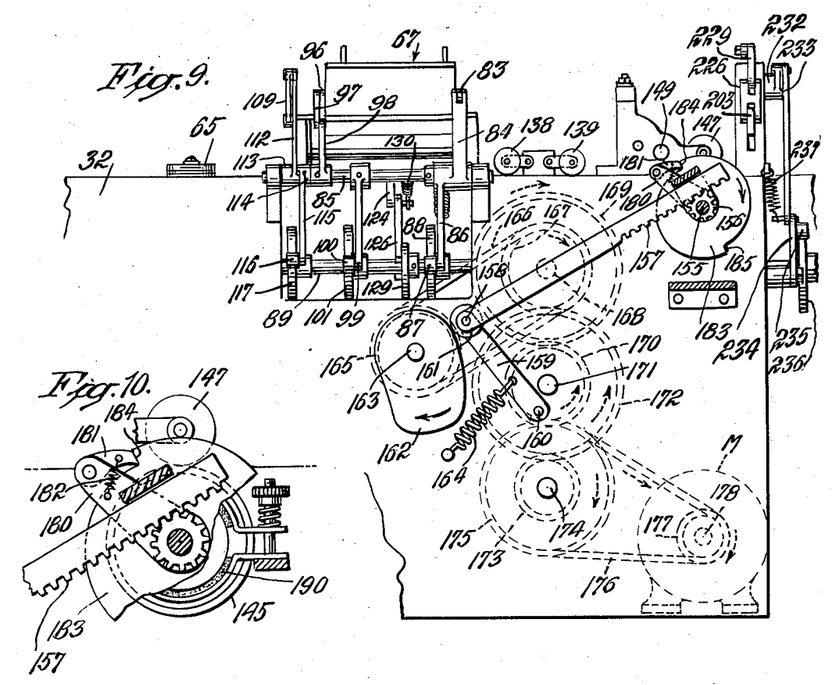
Fig. 9 is a rear elevation of a portion of the machine, this portion including the lead feed, strip feed and cutter.
Fig. 10 is an elevational view, partly in section and on an enlarged scale, showing the drive for the strip feed roller.

The roller 145 is operated in the manner shown in Figs. 9 and 10. This roller is rotatably mounted on a shaft 155 on which is rotatably mounted a spur gear 156 which meshes with a reciprocatable rack 157 pivoted at 158 to a link 159 which is mounted on a fixed pivot 160. A roller 161 is mounted on the pivot 158 and is held against a cam 162 on a shaft 163 by a spring 164 which engages the arm 159. The shaft 163 has mounted thereon a sprocket wheel 165 which is connected by a chain 166 to a sprocket 167 mounted on a shaft 168. The shaft 168 has secured thereto a gear 169 which meshes with a gear 170 mounted on a spindle 171 and the spindle 171 carries a gear 172 which meshes with a gear 173 on a shaft 174. The shaft 174 has mounted thereon a pulley wheel 175 which is driven by a belt 176 from a pulley wheel 177 mounted on the shaft 178 of a motor M.

The spindle 155 which carries the gear 156 has secured thereto an arm 180, on the outer end of which is pivoted a pawl 181 which is held by a spring 182 against a cam 183. The cam 183 is mounted on the shaft 155 and is secured to the roller 145 so that when the cam is rotated, the roller will be rotated. The cam 183 has a pair of abutments or teeth 184 and 185 which are disposed diametrically opposite each other or 180° apart.

As the rack 157 is reciprocated by the cam 162, the gear 156 will be oscillated thereby, thus causing the pawl 181 to rotate the cam 183 through 180°, causing a corresponding rotation of the roller 145. The rotation of the roller 145 will feed the strip 33 beneath the cutting mechanism, which will next be described. Any tendency of the roller to overfeed the strip is counteracted by a brake band 190 shown in Fig. 10.

*Strip cutting mechanism*

Figure 11:
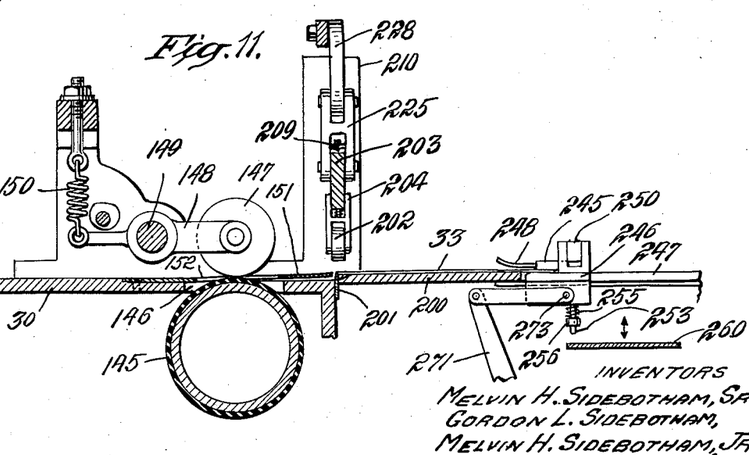
Fig. 11 is a sectional elevation showing the feed roller, cutter, and clamps for receiving the advance end of the cut sheet.

This mechanism is shown particularly in Figs. 1, 8, 11, 13, 14 and 15. As shown in Fig. 11, the strip has been fed from the table 30 to a table 200 on which, as hereinafter described, it is fed at right angles to the direction of feed of the strip to the winding rolls which wind the strip around the core to form the pencil. In passing from the table 30 to the table 200, the strip passes over a stationary knife 201 and the strip is cut by the action of a plurality of rollers mounted above the knife and above the strip, these rollers being movable downwardly and transversely to press the strip against the knife, thus cutting the strip into sheets.

Figures 13, 14, 15:
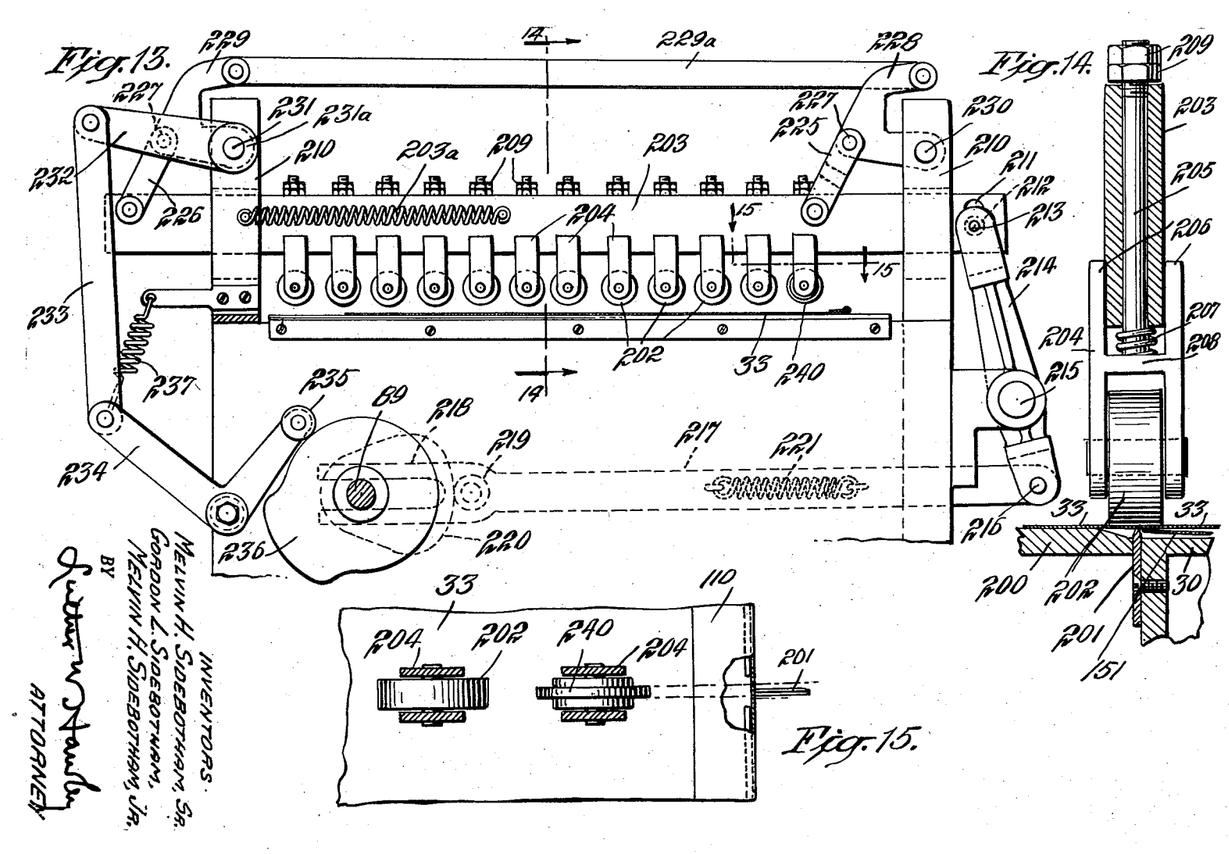
Fig. 13 is an elevational view of the strip cutter.
Fig. 14 is a vertical sectional elevation, on an enlarged scale, taken substantially on line 14—14 of Fig. 13, looking in the direction of the arrows.
Fig. 15 is a sectional elevation, on an enlarged scale, taken substantially on line 15—15 of Fig. 13, looking in the direction of the arrows.

As shown in Fig. 13, a plurality of rollers 202 are carried by a bar 203, the rollers being mounted in the bar in the manner shown in Fig. 14. Each roller is mounted in a bracket 204 having an upwardly extending pin 205 which is slidably mounted in the bar 203. The bracket 204 has extensions 206 which guide the bracket in the upward movement thereof, and a spring 207 surrounds the pin 205 and is disposed between the lower edge of the bar 203 and a transverse abutment member 208 in the bracket. Nuts 209 engage the upper end of the pin 205 and hold the pin in position on the bar.

The bar 203 is slidably mounted in vertically extending members 210 and the bar is also capable of vertical movement as well as longitudinal movement in the supporting members 210. The longitudinal movement on the bar is accomplished in the following manner. At one end of the bar there is disposed a slot 211 which receives a roller 212 mounted on a pin 213 carried by the upper end of a lever 214 which is mounted on a fixed pivot 215. The lower end of the lever has pivoted thereto at 216, a pitman link 217 which has a bifurcated end 218 which straddles the shaft 89. The pitman carries a roller 219 which engages a cam 220 mounted on the shaft 89, and a spring 221 holds the roller in engagement with the cam. This longitudinal movement of the bar 203 is accomplished after the bar has been lowered so that the rollers 202 will engage the upper surface of the strip. A spring 203a assists in returning the bar to its initial position shown in Fig. 13. The bar is raised and lowered in the following manner. Links 225 and 226 are pivoted at the bar at their lower ends and at their upper ends are pivoted at 227 to U-shaped links 228 and 229 which are connected by a link 229a. These links are pivoted to the members 210 at 230 and 231. The link 229 is fixed at 231 to a spindle 231a which has secured thereto an arm 232 connected by a link 233 to an L-shaped lever 234 which has at one end a roller 235 which engages a cam 236 on the shaft 89. A spring 237 holds the roller in engagement with the cam. As the cam is rotated, the lever 234 is moved in an anti-clockwise direction, a downward pull will be exerted on the link 233 and the arm 232, thus causing the spindle 231a to swing the U-shaped link 229 in an anti-clockwise direction, which will cause the bar 203 to be lowered. When the bar has been lowered, the cam 220 will actuate the pitman link 217 and through the lever 214 will cause the bar 203 to be moved transversely across the strip, thus severing the strip into sheets. From the showing in Fig. 15 it will be noted that the right hand roller, which is designated 240, is narrower than the other rollers 202, so that when the bar and rollers are moved to the right, the roller 240 will pass between the leads which have been sealed in spaced relation under the folded edge of the sheet.

*Mechanism for feeding the severed sheet to the center of the table*

This mechanism is illustrated particularly in Figs. 1, 2, 11, 27 and 28. As shown in Fig. 11, the advance end of the sheet is fed beneath a pair of clamps 245 which are mounted on bars 246 slidably mounted in transverse openings 247 in the table 200. The clamps 245 have guide fingers 248 to guide the strip beneath the clamps.

These clamps are operated in the following manner. Each clamp is carried by an L-shaped member 250 which is mounted on a pivot 251. Each of the members 250 has loosely pivoted thereon, at 252, a downwardly extending pin 253 which is slidably mounted in a block 254 on which the member 250 is pivoted. Beneath the block 254 is mounted a spring 255 which encircles the pin 253 and is held in position by a nut 256. The downwardly extending portion 257 of the member 250 has a right angle extension 258 which is adapted to clamp the edge of the sheet when the clamping member 250 is swung downwardly. It will be noted that the spring 255 tends to close the clamp and the lower end of the pin 253 is engaged by an arm 260 of a bell crank lever 261 mounted on a pivot 262. As the bell crank lever is swung on its pivot, the arm 260 will be raised or lowered, as the case may be. The two bell crank levers of the two clamps are connected by a link 263 and the operation of these levers is controlled by a pitman 264 which has a roller 265 engaging a cam 266 mounted on the shaft 89. The roller is held in engagement with the cam by a spring 270. When the sheet is fed beneath the clamps, the arms 260 will move downwardly, permitting the springs 255 to close the clamps. Thereupon the clamps will be moved transversely on the table 200 to center the sheet on the table. This is accomplished by means of arms 271 and 272 which are pivoted at 273 to the blocks 254 and are secured to a shaft or spindle 274 which has at one end an arm 275 having a roller 276 engaging a cam 277 mounted on the shaft 89. As the cam rotates, the arm 275 will swing, thus oscillating the shaft 274 and the arms 271 and 272 mounted thereon, causing the clamps to move transversely of the table and position the sheet centrally thereon.

Figure 2:
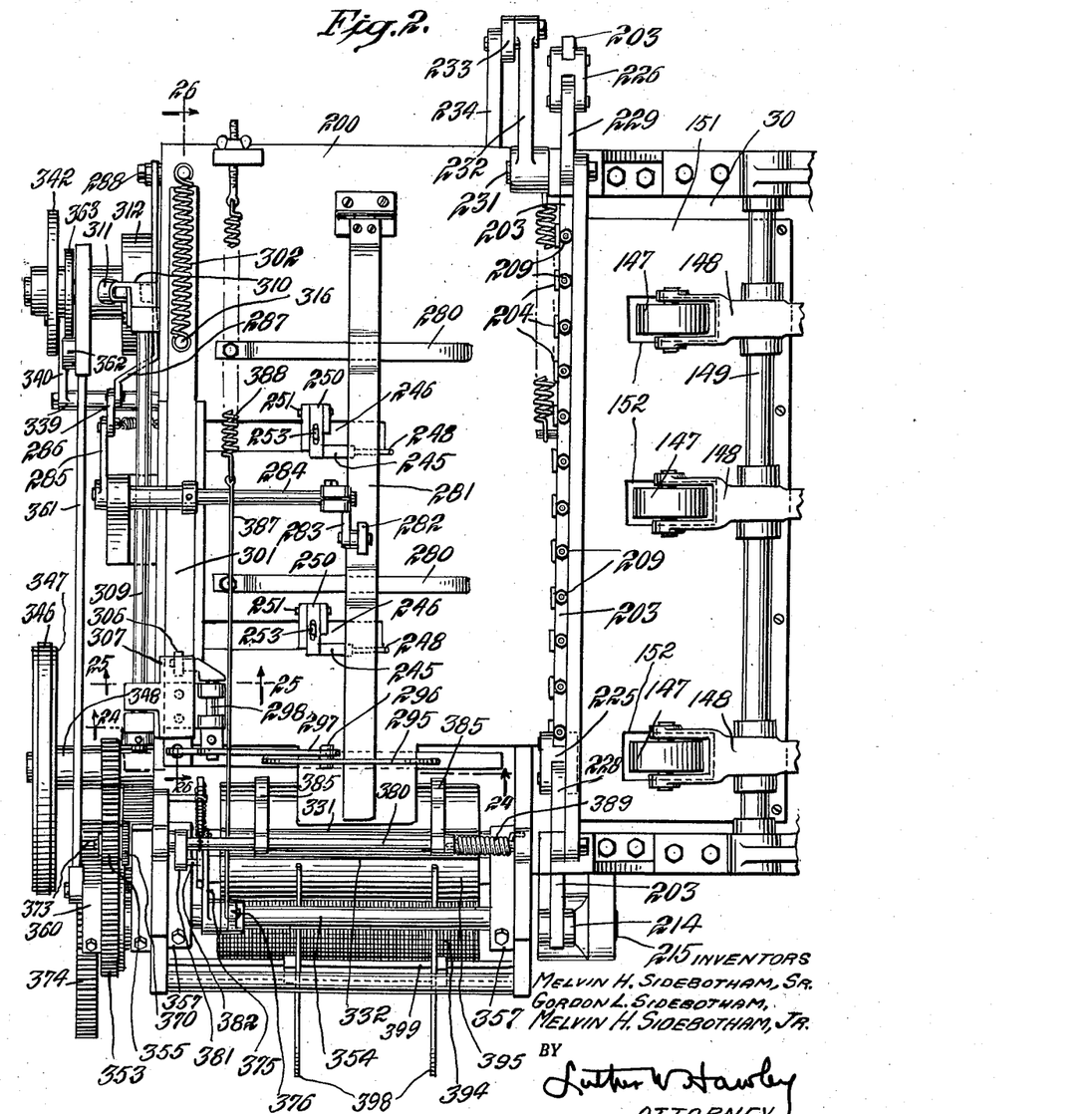
Fig. 2 is a plan view of the left hand end portion of the machine shown in Fig. 1.

As shown in Fig. 2, the table has a pair of transverse hold-down strips 280 and a pivoted, longitudinally extending strip 281. When the sheet has been fed to the table beneath the strips 280 and 281, the strip 281 is swung downwardly on its pivot in the following manner. A lug 282 is mounted on the upper surface of the strip 281 and the lug is pivoted to an arm 283 carried by a spindle 284. The outer end of the spindle has secured thereto an arm 285 which is connected by a link 286 to a lever 287 mounted on a fixed pivot 288 and having a roller 289 engaging a cam 290 mounted on the shaft 89. A spring 291 holds the roller against the cam. After a sheet has been fed beneath the strip 281, the lug 282 is actuated in the manner above described to press the strip downwardly and hold the severed sheet in position on the table.

*Mechanism for feeding the sheet to the winding mechanism*

This mechanism is shown particularly in Figs. 1, 2, 8, 24, 25 and 26. From the showing in Fig. 2 it will be noted that the edge of the sheet with the lead sealed therein will be positioned beneath a clamp 295 which is pivoted at 296 to an arm 297 mounted on a pivot 298 and having a rearwardly extending tail 299 which is disposed above a spring 300. The spring normally tends to depress the clamp into operative position on the sheet. The arm 297 and the parts 298 and 299 are mounted on a slide 301, which is slidable longitudinally on the table 200 and is normally held in retracted position by means of a spring 302.

The clamp 295 is controlled in the following manner. The pivot shaft 298 of the arm 297 has also secured thereto an arm 305 having on the outer end thereof a roller 306. This roller is disposed beneath a plate 307 carried by a block 308 mounted on a shaft 309. The shaft is controlled by a downwardly extending arm 310, which has on its lower end a roller 311 engaged by a cam 312. As the cam rotates, the roller will be swung and will cause the shaft 309 to oscillate, thus depressing or raising the plate 307. As the plate is depressed, the rotation of the spindle 298 will cause the arm 297 to raise the clamp 295. However, when the plate is raised, the spring 300 will cause the arm to lower the clamp 295 into operative sheet engaging position. After the sheet has been engaged by the clamp, the slide 301 which carries the clamp is moved longitudinally in the following manner, attention being directed particularly to Figs. 12 and 26. A link 315 is pivoted at 316 to the slide 301 and is connected at its other end to an arm 317 which is mounted on the shaft 318. Shaft 318 also has an arm 319 having a spherical roller 320 disposed in a yoke 321 mounted on a pivot 322. The yoke 321 has connected thereto a pitman link 323 having a roller 324 engaging a cam 325 mounted on the shaft 89. The rear end of the pitman link 323 straddles the shaft 89. Thus, as the sheet has been clamped by the clamp 295, the operating mechanism just described and shown in Figs. 12 and 26 will cause the slide 301 which carries the clamp to move longitudinally on the table and feed the sheet to the winding rolls.

*Sheet winding and pencil discharge mechanism*

This mechanism is shown particularly in Figs. 1, 2, 8, and 18 to 21 inclusive. The sheet is wound by three winding rolls 330, 331 and 332, the roller 330 being disposed above the rollers 331 and 332 and mounted on an axis disposed in a plane between the axes of the rollers 331 and 332. This is shown clearly in Fig. 22. Moreover, the rollers 331 and 332 are mounted for rotation on fixed spindles, whereas the roller 330 is mounted on a spindle which is movable vertically in an arc so that the roller 330 can be raised to receive the advance edge of the sheet to be wound, this edge having the core sealed therein, and can thereafter be lowered to effect the winding operation.

Figure 18:
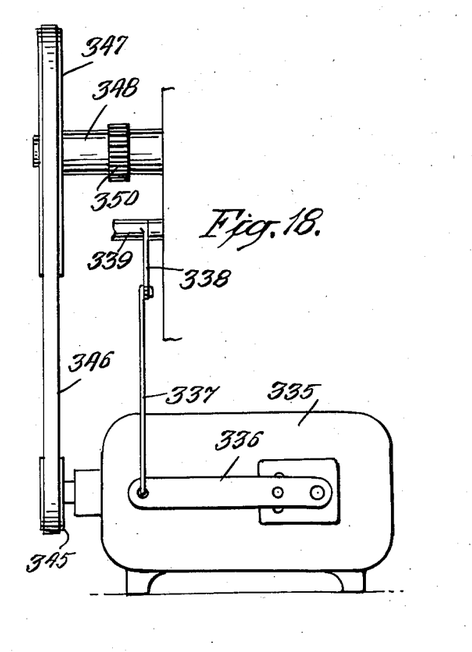
Fig. 18 is a fragmentary elevational view showing the drive for the sheet winding rollers.

The winding rollers are driven from a separate source of power and a separate motor, as illustrated in Fig. 18. In this figure there is shown, at 335, a Vickers automatic drive transmission, which is controlled by a lever 336 to which is connected a link 337, the other end of the link being connected to an arm 338 carried by a spindle 339. This is shown also in Fig. 8. The spindle 339 also has secured thereto an arm 340 having a roller 341 engaging a cam 342 mounted on the shaft 89. The cam 342 is designed to operate the link 337 through the arms 338 and 340 to cause the automatic transmission to speed up during the winding operation so that the sheath will be wound quickly and be discharged from the machine.

The automatic transmission 335 has a pulley 345 which is connected by a belt 346 to a pulley 347 mounted on a shaft 348. The shaft 348 has a gear 350 secured thereto which meshes with a gear 351 mounted on a shaft 352. The gear 351 also meshes with a gear 353 mounted on a spindle 354. Gear 353 meshes with a gear 355 mounted on a spindle 356 carried by arms 357 which are pivoted on the spindle 354. The spindle 354 also has clamped thereon an arm 360 which is connected to a pitman link 361, the rear end of which straddles the shaft 89 and has a roller 362 mounted thereon and engaging a cam 363 mounted on the shaft 89. As the cam rotates, the link 361, arm 360, spindle 354 and arms 357 will swing the top roller 330 into operative or inoperative position, as the case may be.

The rollers 330, 331 and 332 are driven in the following manner. As hereinbefore stated, the gear 350 is mounted on the shaft 348 which is driven by the belt drive from the transmission 335. The shaft 352 has also mounted thereon a spur gear 364 which meshes with gears 365 and 366 mounted respectively on the spindles 367 and 368 of the winding rolls 332 and 331.

The shaft 356 has also mounted thereon a gear 370 which meshes with a gear 371 on the spindle 372 of the winding roller 330.

Shaft 352 has also mounted thereon a gear 373 which meshes with a gear 374 on a shaft 393 which has mounted thereon a corrugated glue roller 394 which delivers the glue to a roller 395 mounted on shaft 352. Roller 394 rotates in a glue tank 396 and the amount of glue carried by the rollers is controlled by blades 397. The glue is transferred by roller 395 to the serrated rollers 331 and 332.

*Pencil ejecting mechanism*

Figure 8:
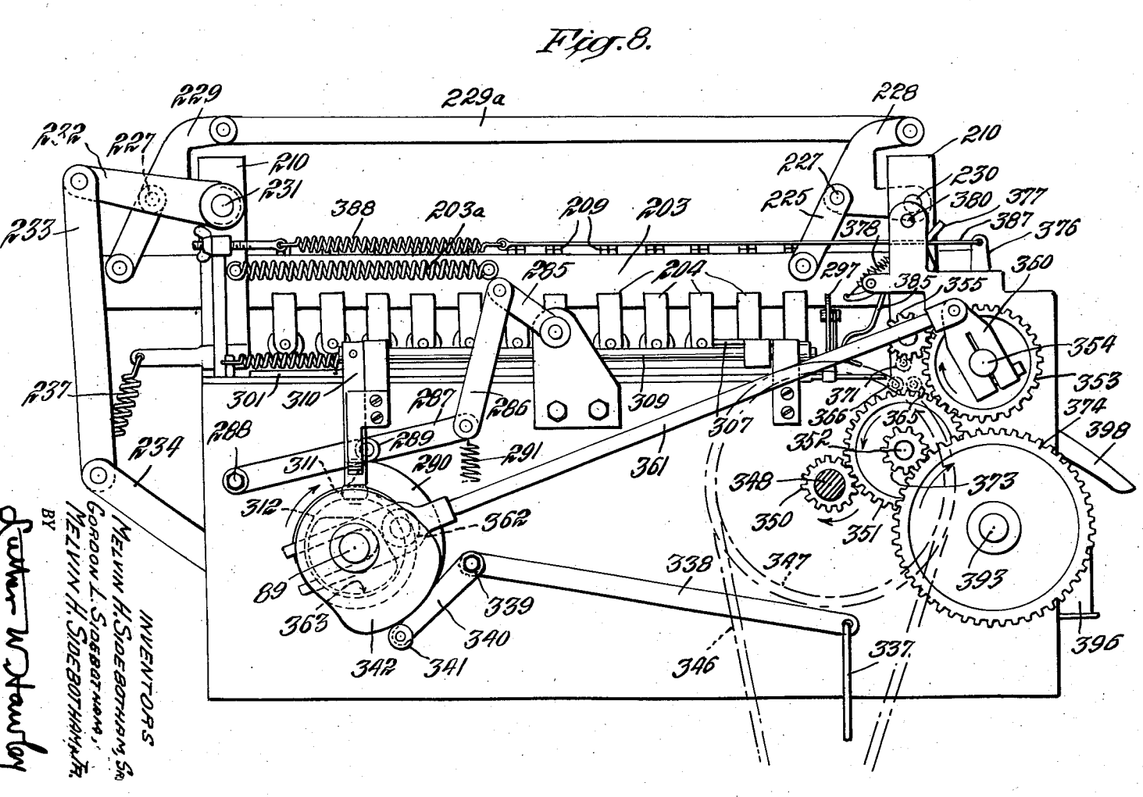
Fig. 8 is an end elevation of the left hand end of the machine looking toward the right, certain parts being omitted for the sake of clearness.
Figure 19:
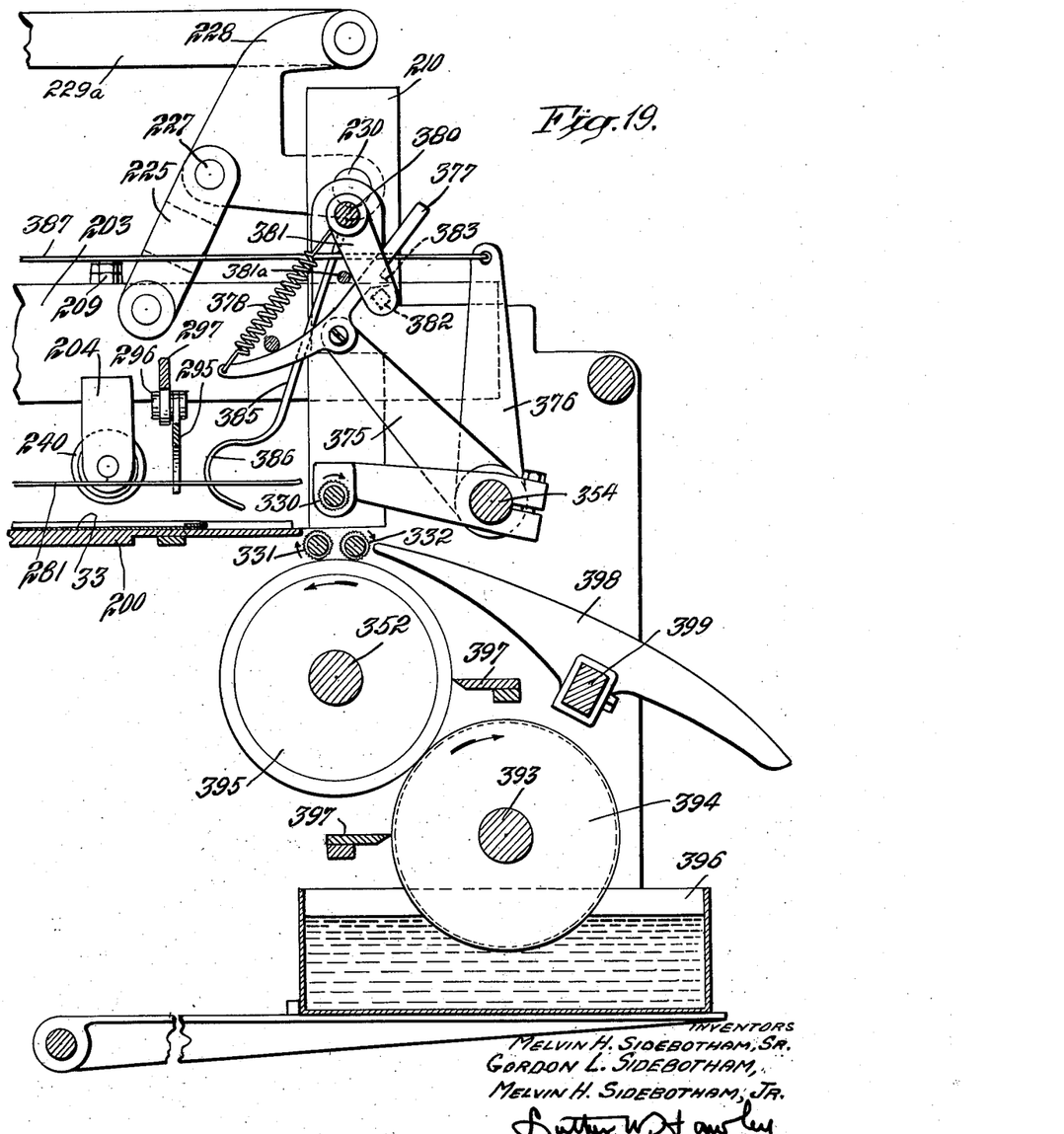
Fig. 19 is a vertical sectional elevation through the glue applying mechanism, sheet winding rollers, and ejection device.
Figures 20, 21, 22, 23:
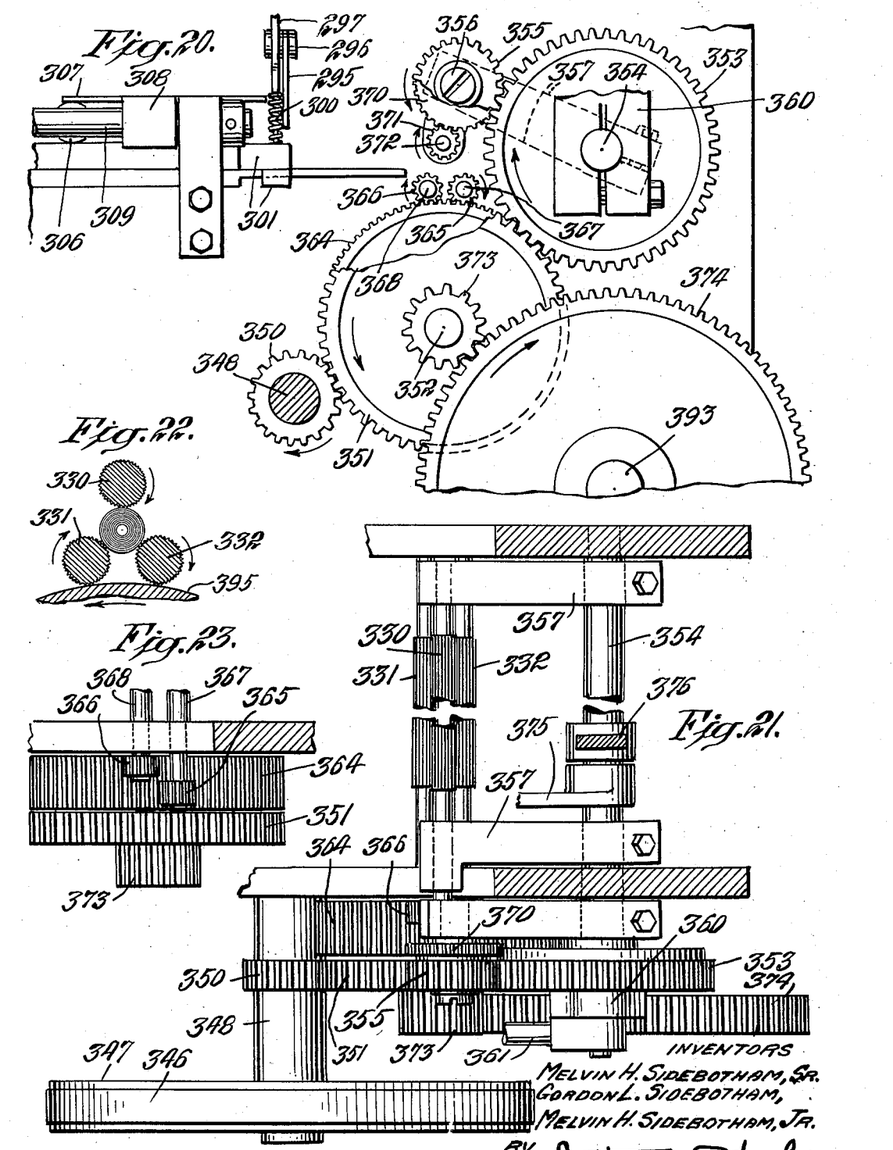
Fig. 20 is a fragmentary elevational view showing in end elevation the clamp for clamping the sheet and feeding it to the winding rolls and also showing the driving connections for the winding rolls.
Fig. 21 is a plan view of the structure shown in Fig. 20.
Fig. 22 is an enlarged fragmentary sectional elevation showing the winding rolls and contacting glue roller.
Fig. 23 is a sectional detail view showing the gearing for driving the two lower winding rolls.
Figures 24, 25:
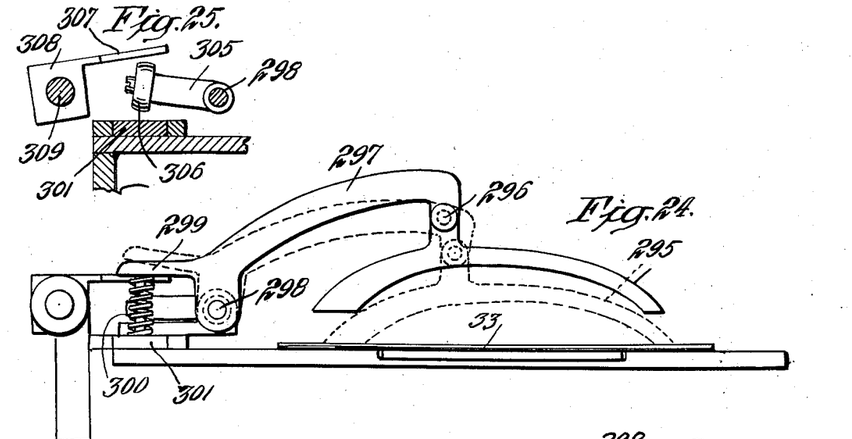
Fig. 24 is an elevational view illustrating the clamp which clamps and feeds the sheets to the winding rolls, this view being taken substantially on line 24—24 of Fig. 2, looking in the direction of the arrows.
Fig. 25 is a sectional elevation taken substantially on line 25—25 of Fig. 2, looking in the direction of the arrows.
Figures 26, 27, 28:
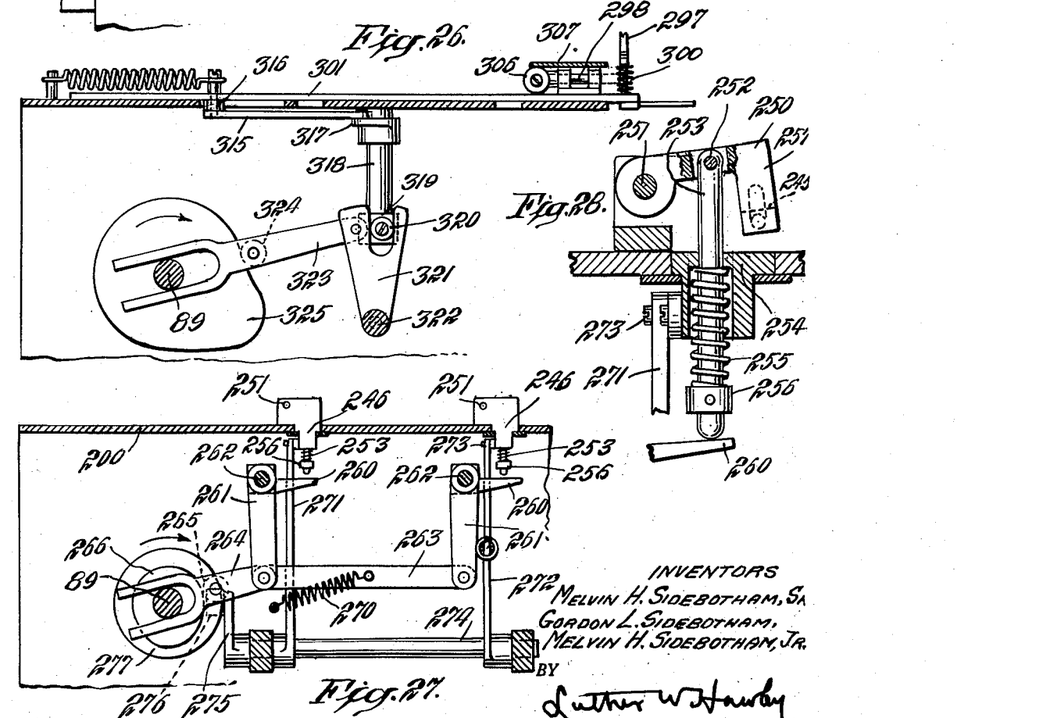
Fig. 26 is a sectional elevation taken substantially on line 26—26 of Fig. 2, looking in the direction of the arrows.
Fig. 27 is a sectional elevation illustrating the clamp control and moving mechanism.
Fig. 28 is an enlarged sectional elevation showing the construction of the clamps which receive the sheet after it has been cut and feed it to a central position on the delivery table.

This mechanism is shown particularly in Figs. 2, 8 and 19. The spindle 354, in addition to carrying the arm 357, also has mounted thereon an arm 375, this arm also being connected to an arm 376. The arm 375 has pivoted on the outer end thereof, a tripping bar 377 and a spring 378 is connected to one end of the bar 377. A spindle 380 has an arm 381 extending downwardly therefrom and provided with a laterally extending stud 382. The lower surface of the bar 377 has extending downwardly therefrom a tooth 383. The spindle 380 also carries ejecting members or rods 385 having a hooked lower end 386 adapted to engage and eject the completed pencil or wound sheath after the winding operation has been completed.

The spindle 380 is encircled by a torsion spring 389 which returns arms 385 to their initial position, shown in Fig. 19, after they have ejected the pencil. The arm 381 is also returned to its initial position and engages a stop 381*a*.

The arm 376 has a rod 387 connected thereto and the other end of this rod has secured thereto a spring 388. When the winding of the sheath has been completed, the spindle 354 will be rotated in a clockwise direction to raise the upper winding roll 330 and when the winding roll moves into operative position to wind the sheath the arm 375 carried by the spindle 354 will be swung downwardly, thus causing the tooth 383 to be disposed below the stud 382. Then when the spindle 354 is oscillated to raise the winding roller 330, the tooth, by engaging the stud, will swing the arm 381 in an anti-clockwise direction, thus causing the rods 385 and hooked ends 386 to engage and eject the pencil. The pencils are discharged by the ejectors onto blades 398 carried by a bar 399.

In the foregoing specification the shaft 89 has been described and, as explained, this shaft has a plurality of cams for operating the various mechanism. The shaft 89 is driven from the shaft 168 by a beveled gear driving connection 390, 391 illustrated on Fig. 12.

From the foregoing description it will be clear that the machine will operate automatically to feed a paper strip, apply glue to one edge of the strip, fold the strip, deposit cores of lead or other material in spaced relation under the folded edge, cut the strip into sheets, center the sheets on the delivery table, feed the sheets to the winding mechanism, apply adhesive to the sheets as they are being wound into sheaths, and eject the sheaths from the machine.

Although one specific embodiment of the invention has been particularly shown and described it will be understood that the invention is capable of modification and that changes in the construction and in the arrangement of the various cooperating parts may be made without departing from the spirit or scope of the invention, as expressed in the following claims.

What we claim is:

1. The method of forming a sheath around a core which consists of feeding a strip of flexible material, folding one longitudinal edge portion of the strip to form a channel, depositing cores in the channel in spaced relation, fastening the said portion around the cores, severing the strip into sheets at the spaces between the cores, feeding the sheets, and winding and securing the sheets around the cores.

2. The method of forming a sheath around a core which consists of feeding a strip of flexible material, folding one longitudinal edge portion of the strip to form a channel, depositing cores in the channel in spaced relation, fastening the said portion around the cores, severing the strip into sheets at the spaces between the cores, feeding the sheets at right angles to the direction of feed of the strip, and winding and securing the sheets around the cores.

3. The method of forming a sheath around a core which consists of feeding a strip of flexible material, folding one longitudinal edge portion of the strip to form a channel, depositing and tamping cores in the channel in spaced relation, fastening the said portion around the cores, severing the strip into sheets at the spaces between the cores, feeding the sheets, and winding and securing the sheets around the cores.

4. The method of forming a sheath around a core which consists of feeding a strip of flexible material, scoring and folding one longitudinal edge portion of the strip to form a channel, depositing cores in the channel in spaced relation, fastening the said portion around the cores, severing the strip into sheets at the spaces between the cores, feeding the sheets, and winding and securing the sheets around the cores.

5. The method of forming a sheath around a core which consists of feeding a strip of flexible material, applying adhesive to and folding one longitudinal edge portion of the strip to form a channel, depositing cores in the channel in spaced relation, fastening the said portion around the cores, severing the strip into sheets at the spaces between the cores, feeding the sheets, and winding and securing the sheets around the cores.

6. In a machine for forming a sheath around a core, means for feeding a strip of material, a table for supporting the strip, means at one edge of the table for applying adhesive to the edge of the strip, means for folding said edge to form a channel, means above the table for depositing cores, one at a time and in spaced relation, in said channel, means for sealing said cores in the channel, means for severing the strip between spaced cores to form sheets, a second table, sheet winding means on said second table, means for feeding the sheets with the cores sealed in the advance ends to said sheet winding means, and means for operating the winding means to wind the sheets around the cores.

7. In a machine for forming a sheath around a core, means for feeding a strip of material, a table for supporting the strip, means at one edge of the table for applying adhesive to the edge of the strip, means for folding said edge to form a channel, means above the table for depositing cores, one at a time and in spaced relation, in said channel, means for sealing said cores in the channel, means for severing the strip between spaced cores to form sheets, a second table, glue applying and sheet winding means on said second table, means for feeding the sheets with the cores sealed in the advance ends to said sheet winding means, and means for operating the winding means to wind the sheets around the cores.

8. In a machine for forming a sheath around a core, means for feeding a strip of material, a table for supporting the strip, means at one edge of the table for applying adhesive to the edge of the strip, means for folding said edge to form a channel, means above the table for depositing cores, one at a time and in spaced relation, in said channel, means for sealing said cores in the channel, means for severing the strip between spaced cores to form sheets, a second table, sheet winding means on said second table, means for feeding the sheets in a direction at an angle to the strip feed, with the cores sealed in the advance ends to said sheet winding means, and means for operating the winding means to wind the sheets around the cores.

9. In a machine for forming a sheath around a core, means for feeding a strip of material, a table for supporting the strip, means at one edge of the table for applying adhesive to the edge of the strip, means for folding said edge to form a channel, means above the table for depositing cores, one at a time and in spaced relation, in said channel, means for sealing said cores in the channel, means for severing the strip between spaced cores to form sheets, a second table, feeding means for centering the sheets on said second table, sheet winding means on said second table, means for feeding the sheets with the cores sealed in the advance ends to said sheet winding means, and means for operating the winding means to wind the sheets around the cores.

References Cited in the file of this patent

UNITED STATES PATENTS

| | | |
|---|---|---|
| 550,212 | Blaisdell | Nov. 19, 1895 |
| 1,208,019 | Roney | Dec. 12, 1916 |
| 1,308,479 | Campbell | July 1, 1919 |
| 1,418,659 | Lantery | June 6, 1922 |
| 1,465,861 | Oppman | Aug. 21, 1923 |
| 1,497,196 | Potdevin | June 10, 1924 |
| 2,259,959 | Miller | Oct. 21, 1941 |
| 2,298,363 | Ganz | Oct. 13, 1942 |
| 2,574,154 | Noe | Nov. 6, 1951 |